(12) United States Patent
Kim et al.

(10) Patent No.: US 8,999,549 B2
(45) Date of Patent: Apr. 7, 2015

(54) COOLING MEMBER OF IMPROVED COOLING EFFICIENCY AND BATTERY MODULE EMPLOYED WITH THE SAME

(71) Applicant: LG Chem, Ltd., Seoul (KR)

(72) Inventors: MinJung Kim, Suwon-si (KR); Jin Kyu Lee, Daejeon (KR); DalMo Kang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/946,114

(22) Filed: Jul. 19, 2013

(65) Prior Publication Data

US 2013/0309543 A1 Nov. 21, 2013

Related U.S. Application Data

(63) Continuation of application No. PCT/KR2012/000407, filed on Jan. 18, 2012.

(30) Foreign Application Priority Data

Feb. 22, 2011 (KR) .................. 10-2011-0015342

(51) Int. Cl.
*H01M 10/50* (2006.01)
*H01M 10/613* (2014.01)
(Continued)

(52) U.S. Cl.
CPC ...... *H01M 10/5004* (2013.01); *H01M 10/5016* (2013.01); *H01M 10/5032* (2013.01);
(Continued)

(58) Field of Classification Search
CPC .............. H01M 6/5038; H01M 10/50; H01M 10/5004; H01M 10/5008

USPC .......................... 429/129, 437, 120
See application file for complete search history.

(56) References Cited

U.S. PATENT DOCUMENTS 4,095,160 A 6/1978 Sedlmayer et al.
5,866,997 A 2/1999 Sorsa et al.
(Continued)

FOREIGN PATENT DOCUMENTS

CN 1485264 A 3/2004
FI 100594 B 1/1998
(Continued)

OTHER PUBLICATIONS

International Search Report for PCT/FI2012/050098 mailed May 23, 2012.
(Continued)

*Primary Examiner* — Jonathan Jelsma
(74) *Attorney, Agent, or Firm* — Birch, Stewart, Kolasch & Birch, LLP (57) ABSTRACT

Disclosed is a cooling member mounted at a top and/or a bottom of a battery module or a battery pack to remove heat generated from battery cells during charge and discharge of the battery cells, wherein the cooling member includes a thermal conduction member including a stepped fastening plate having step portions of different lengths, coolant flow channels being formed at interfaces of the fastening plate and a coolant conduit configured to have a hollow structure through which a coolant flows, the coolant conduit including a main conduit and one or more branch conduits extending vertically in a state in which the branch conduits communicate with the main conduit such that the branch conduits communicate with the coolant flow channels of the thermal conduction member.

20 Claims, 8 Drawing Sheets

(51) Int. Cl.
*H01M 10/625* (2014.01)
*H01M 10/647* (2014.01)
*H01M 10/6555* (2014.01)
*H01M 10/6557* (2014.01)
*H01M 10/6567* (2014.01)
*H01M 2/10* (2006.01)

(52) U.S. Cl.
CPC ...... *H01M10/5055* (2013.01); *H01M 10/5059* (2013.01); *H01M 10/5075* (2013.01); *H01M 2/1077* (2013.01); *H01M 2220/20* (2013.01)

(56) References Cited

U.S. PATENT DOCUMENTS

| | | |
|---|---|---|
| 2003/0173063 A1 | 9/2003 | Suzuki |
| 2004/0168447 A1 | 9/2004 | Sugito et al. |
| 2006/0090883 A1 | 5/2006 | Huang et al. |
| 2006/0214641 A1 | 9/2006 | Cho |
| 2009/0142628 A1* | 6/2009 | Okada et al. ............. 429/8 |
| 2011/0027640 A1* | 2/2011 | Gadawski et al. ........ 429/120 |
| 2011/0052960 A1* | 3/2011 | Kwon et al. ............. 429/120 |
| 2011/0212355 A1* | 9/2011 | Essinger et al. ......... 429/120 |
| 2012/0009457 A1 | 1/2012 | Lee et al. |
| 2012/0045681 A1* | 2/2012 | Klaus et al. ............. 429/120 |
| 2013/0115506 A1* | 5/2013 | Wayne et al. ............ 429/120 |

FOREIGN PATENT DOCUMENTS

| | | |
|---|---|---|
| JP | 60-60509 A | 4/1985 |
| JP | 60-188794 A | 9/1985 |
| JP | 62-41587 A | 2/1987 |
| JP | 8-46381 A | 2/1996 |
| JP | 9-92994 A | 4/1997 |
| JP | 2001-23703 A | 1/2001 |
| JP | 2001-44347 A | 2/2001 |
| JP | 2002-261481 A | 9/2002 |
| JP | 2003-247790 A | 9/2003 |
| JP | 2004-103258 A | 4/2004 |
| JP | 2004-228386 A | 8/2004 |
| JP | 2006-127921 A | 5/2006 |
| JP | 2006-135275 A | 5/2006 |
| JP | 2006-210245 A | 8/2006 |
| JP | 2006-278330 A | 10/2006 |
| JP | 2007-166820 A | 6/2007 |
| JP | 2008-159440 A | 7/2008 |
| JP | 2008-181734 A | 8/2008 |
| JP | 2008-282678 A | 11/2008 |
| JP | 2010-153141 A | 7/2010 |
| JP | 2010-157502 A | 7/2010 |
| JP | 2010-277863 A | 12/2010 |
| KR | 10-2009-0122270 A | 11/2009 |
| KR | 10-2010-0041452 A | 4/2010 |
| KR | 10-2010-0081942 A | 7/2010 |

OTHER PUBLICATIONS

Japanese Office Action, dated Nov. 5, 2014, for Japanese Application No. 2013-554384 with a partial English translation.

* cited by examiner

COOLING MEMBER OF IMPROVED COOLING EFFICIENCY AND BATTERY MODULE EMPLOYED WITH THE SAME

CROSS REFERENCE TO RELATED APPLICATIONS

This application is a Continuation of PCT International Application No. PCT/KR2012/000407 filed on Jan. 18, 2012, which claims priority under 35 U.S.C 119(a) to Application No. 10-2011-0015342 filed in Republic of Korea on Feb. 22, 2011, all of which are hereby expressly incorporated by reference into the present application.

TECHNICAL FIELD

The present invention relates to a cooling member of improved cooling efficiency and a battery module including the same and, more particularly, to a cooling member mounted at a top and/or a bottom of a battery module configured to have a structure in which a plurality of unit modules, each of which includes one or more battery cells, is arranged in a lateral direction or a battery pack configured to have a structure in which a plurality of battery modules is arranged in a lateral direction to remove heat generated from the battery cells during charge and discharge of the battery cells, wherein the cooling member includes a thermal conduction member including a stepped fastening plate having step portions of different lengths, coolant flow channels being formed at interfaces of the fastening plate and a coolant conduit including a main conduit located at a front and/or a rear of the battery module or the battery pack and one or more branch conduits extending vertically in a state in which the branch conduits communicate with the main conduit such that the branch conduits communicate with the coolant flow channels of the thermal conduction member and wherein mounting grooves corresponding to an external shape of the branch conduits are formed in a relatively long step portion of the fastening plate at ends of the coolant flow channels of the thermal conduction member such that the branch conduits of the coolant conduit are connected to the coolant flow channels of the thermal conduction member and auxiliary plates for surrounding outer circumferences of the branch conduits in a state in which the branch conduits are mounted in the mounting grooves are mounted at the fastening plate.

BACKGROUND ART

Recently, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells per device. On the other hand, middle or large-sized devices, such as vehicles, use a middle or large-sized battery module having a plurality of battery cells electrically connected to one another because high power and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the pouch-shaped battery is lightweight, the manufacturing costs of the pouch-shaped battery are low, and it is possible to easily modify the shape of the pouch-shaped battery.

Battery cells constituting such a middle or large-sized battery module may be secondary batteries which can be charged and discharged. Consequently, a large amount of heat is generated from such high-power, large-capacity secondary batteries during charge and discharge of the batteries. In particular, the laminate sheet of each pouch-shaped battery widely used in the battery module has a polymer material exhibiting low thermal conductivity coated on the surface thereof with the result that it is difficult to effectively lower overall temperature of the battery cells.

If the heat, generated from the battery module during charge and discharge of the battery module, is not effectively removed from the battery module, the heat accumulates in the battery module with the result that deterioration of the battery module is accelerated. According to circumstances, the battery module may catch fire or explode. For this reason, a middle or large-sized battery pack for vehicles, which is a high-power, large-capacity battery including a plurality of middle or large-sized battery modules, needs a cooling system to cool battery cells mounted in the battery pack.

Each battery module mounted in a middle or large-sized battery pack is generally manufactured by stacking a plurality of battery cells with high integration. In this case, the battery cells are stacked in a state in which the battery cells are arranged at predetermined intervals such that heat generated during charge and discharge of the battery cells can be removed. For example, the battery cells may be sequentially stacked in a state in which the battery cells are arranged at predetermined intervals without using an additional member. Alternatively, in a case in which the battery cells have low mechanical strength, one or more battery cells may be mounted in a cartridge to constitute a unit module, and a plurality of unit modules may be stacked to constitute a battery module. The cartridge increases the mechanical strength of the battery cells; however, the cartridge also increases the overall size of the battery module.

In addition, coolant flow channels are defined between the stacked battery cells or between the stacked battery modules such that heat accumulated between the stacked battery cells or between the stacked battery modules is effectively removed.

In a case in which the cooling structure is based on a water cooling type cooling system, a coolant conduit extends through an integrated thermal conduction member.

Specifically, there is used a cooling member having a structure in which a heat sink connection portion connected to a pipeline is formed in a protruding shape in order to inject a coolant into a flow channel defined in a heat sink and then the heat sink connection portion is inserted into the pipeline by force fitting.

In the cooling member with the above-stated construction, however, the heat sink connection portion must be inserted into a plurality of pipelines by force fitting. For this reason, it is difficult to assemble the cooling member.

In order to solve the above problem, a structure in which auxiliary pipes are mounted in the heat sink and are then integrally connected to the pipelines such that a coolant flows from the pipelines to the auxiliary pipes mounted in the heat sink may be designed.

However, the cooling member with the above-stated construction has a problem in that cooling heat of the coolant is reduced due to the auxiliary pipes with the result that cooling efficiency is lowered as compared with the structure in which the coolant directly flows in the heat sink.

Consequently, there is a high necessity for a cooling member that is capable of improving cooling efficiency, ensuring long-term durability, and improving assembly efficiency and a battery module of excellent safety using the cooling member.

DISCLOSURE

Technical Problem

The present invention has been made to solve the above-mentioned problems, and it is an object of the present invention to provide a cooling member configured to have a structure in which a thermal conduction member includes a stepped fastening plate having step portions of different lengths and coolant flow channels are formed at interfaces of the fastening plate such that the coolant flow channels communicate with a coolant conduit with the result that a coolant, introduced into the coolant conduit, flows along the coolant flow channels of the thermal conduction member, thereby preventing loss of cooling heat of the thermal conduction member as compared with a conventional structure in which additional auxiliary conduits are mounted in the thermal conduction member.

It is another object of the present invention to provide a cooling member configured to have a structure in which a coolant conduit includes a main conduit and branch conduits extending from the main conduit such that the branch conduits communicate with the coolant flow channels, mounting grooves are formed in a relatively long step portion of the fastening plate at ends of the coolant flow channels, and auxiliary plates for surrounding the outer circumferences of the branch conduits in a state in which the branch conduits are mounted in the mounting grooves are mounted at the fastening plate, thereby easily connecting the branch conduits to the coolant flow channels of the thermal conduction member.

It is a further object of the present invention to provide a cooling member configured to have a structure in which a main conduit and branch conduits are integrally connected to each other with the result that it is not necessary to perform additional coupling between the main conduit and the branch conduits, thereby improving assembly efficiency and assembly reliability and, in addition, improving cooling efficiency by the provision of coolant flow channels communicating with a coolant conduit.

Technical Solution

In accordance with one aspect of the present invention, the above and other objects can be accomplished by the provision of a cooling member mounted at a top and/or a bottom of a battery module configured to have a structure in which a plurality of unit modules, each of which includes one or more battery cells, is arranged in a lateral direction or a battery pack configured to have a structure in which a plurality of battery modules is arranged in a lateral direction to remove heat generated from the battery cells during charge and discharge of the battery cells, the cooling member including a thermal conduction member disposed at the top and/or the bottom of the battery module or the battery pack, the thermal conduction member including a stepped fastening plate having step portions of different lengths, coolant flow channels being formed at interfaces of the fastening plate and a coolant conduit configured to have a hollow structure through which a coolant flows, the coolant conduit including a main conduit located at a front and/or a rear of the battery module or the battery pack and one or more branch conduits extending vertically in a state in which the branch conduits communicate with the main conduit such that the branch conduits communicate with the coolant flow channels of the thermal conduction member, wherein mounting grooves corresponding to an external shape of the branch conduits are formed in a relatively long step portion of the fastening plate at ends of the coolant flow channels of the thermal conduction member such that the branch conduits of the coolant conduit are connected to the coolant flow channels of the thermal conduction member and auxiliary plates for surrounding outer circumferences of the branch conduits in a state in which the branch conduits are mounted in the mounting grooves are mounted at the fastening plate.

In the cooling member according to the present invention, the thermal conduction member includes the stepped fastening plate having the step portions of different lengths, the coolant flow channels are formed at the interfaces of the fastening plate such that the coolant flow channels communicate with the coolant conduit. As compared with a conventional structure in which additional auxiliary conduits are mounted in the thermal conduction member, therefore, it is possible to prevent loss of cooling heat of the thermal conduction member due to contact resistance between the thermal conduction member and the auxiliary conduits.

In addition, the coolant conduit includes the main conduit and the branch conduits extending from the main conduit such that the branch conduits communicate with the coolant flow channels, the mounting grooves are formed in the relatively long step portion of the fastening plate at the ends of the coolant flow channels, and the auxiliary plates for surrounding the outer circumferences of the branch conduits in a state in which the branch conduits are mounted in the mounting grooves are mounted at the fastening plate, thereby easily achieving coupling between the branch conduits and the thermal conduction member without additional fastening members.

Furthermore, unlike a conventional cooling member, it is not necessary to form an additional fastening part at a portion of the thermal conduction member in order to connect the coolant conduit to the thermal conduction member. Consequently, it is possible to greatly improve assembly efficiency and assembly reliability of the cooling member.

In a preferred example, fastening grooves having a shape corresponding to the outer circumference of the branch conduits may be formed at a bottom of each of the auxiliary plates in an inwardly depressed fashion. In this case, the branch conduits may be loaded in the mounting grooves formed at the relatively long step portion of the fastening plate and then the auxiliary plates may be mounted at the top of the fastening plate and the tops of the branch conduits. Consequently, it is possible to easily achieve fastening therebetween with improved assembly efficiency.

In another preferred example, each of the auxiliary plates may have a length equivalent to 2 to 10% that of the thermal conduction member. If the length of each of the auxiliary plates is less than 2% that of the thermal conduction member or greater than 10% that of the thermal conduction member, coupling force between the branch conduits and the thermal conduction member is lowered, which is not preferable. As long as it is possible to exhibit the above-described effects, however, it may be possible to deviate from the above size range.

The width of each of the auxiliary plates is not particularly restricted so long as the auxiliary plates cover the branch conduits mounted in the mounting grooves of the thermal conduction member. Preferably, each of the auxiliary plates has a width equal to that of the thermal conduction member in order to achieve stable coupling between the auxiliary plates and the thermal conduction member.

In a preferred example, the branch conduits may be integrally connected to the main conduit. Consequently, it is possible to effectively prevent the coolant from leaking from connection regions between the branch conduits and the main conduit.

An insertion length of each of the branch conduits in opposite ends of the mounting grooves may be equivalent to 10 to 30% the length of the thermal conduction member. If the insertion length of each of the branch conduits is less than 10% the length of the thermal conduction member, the coolant may leak from connection regions between the branch conduits and the ends of the coolant flow channels, which is not preferable. On the other hand, if the insertion length of each of the branch conduits is greater than 30% the length of the thermal conduction member, contact resistance between the branch conduits and the thermal conduction member is increased with the result that cooling efficiency may be lowered, which is also not preferable. As long as it is possible to exhibit the above-described effects, however, it may be possible to deviate from the above size range.

The shape of the coolant conduit and the mounting grooves is not particularly restricted so long as the coolant can effectively flow. For example, in terms of hydrodynamics, the coolant conduit and the mounting grooves are preferably formed in a circular shape in vertical section.

In another example, the branch conduits may be constituted by two or more pipes. As compared with a structure in which one branch conduit is provided, therefore, it is possible to improve cooling efficiency of the battery module or the battery pack.

Preferably, the main conduit has a greater diameter than each of the branch conduits. When a coolant introduced into the main conduit flows along branch conduits, therefore, flow velocity of the coolant in the branch conduits is higher than that of the coolant in the main conduit. Consequently, it is possible to improve cooling efficiency of the battery module or the battery pack.

In a concrete example, the diameter of the main conduit may be two to five times that of each of the branch conduits. If the diameter of the main conduit is less than twice that of each of the branch conduits, it may be difficult to increase flow velocity of the coolant in the branch conduits to a desired level, which is not preferable. On the other hand, if the diameter of the main conduit is greater than five times that of each of the branch conduits, the overall size of the battery module or the battery pack is increased, which is also not preferable. As long as it is possible to exhibit the above-described effects, however, it may be possible to deviate from the above size range.

Meanwhile, the coolant conduit is preferably formed of a thermally conductive corrosion-resistant material. Consequently, the coolant conduit is prevented from being corroded by the coolant when the coolant flows in the coolant conduit.

The thermal conduction member may be a heat sink. The heat sink is an object that absorbs heat from another object through heat contact and dissipates the absorbed heat outward.

The thermal conduction member may be arranged in various forms. For example, the thermal conduction member may be provided on a per battery module or battery pack basis. That is, divided thermal conduction members may be provided for the respective battery modules or an integrated thermal conduction member may be provided for the battery pack.

In a preferred example, the cooling member may further include cooling fins disposed between the respective unit modules in a state in which opposite sides of each of the cooling fins are in tight contact with corresponding ones of the unit modules. In this case, the coolant sequentially transfers cooling heat to the thermal conduction member and the cooling fins while flowing in the main conduit and the branch conduits. The cooling heat may effectively cool the respective unit modules.

In a preferred example of the above structure, the cooling fins may be bent such that the cooling fins contact the thermal conduction member in a surface contact fashion.

That is, in a case in which the cooling fins are disposed between the respective unit modules, it is possible to maximize heat dissipation based on thermal conduction since the cooling fins contact the thermal conduction member in the surface contact fashion.

In another preferred example of the above structure, the shape of each of the cooling fins is not particularly restricted so long as the cooling fins can be disposed in tight contact with the unit modules. For example, each of the cooling fins may be formed in a "¬" shape, a "T" shape, a "[" shape, or an "I" shape in vertical section. In this case, it is possible to effectively transfer cooling heat from the thermal conduction member to the unit modules.

Specifically, a "T" shape structure may include a combination of an "I" shape and a "T" shape.

The material for the cooling fins is not particularly restricted so long as the cooling fins exhibit excellent thermal conductivity necessary to realize high cooling efficiency. For example, each of the cooling fins may be formed of a metal plate exhibiting high thermal conductivity.

Preferably, each of the battery cells is a plate-shaped secondary battery, which has a small thickness and a relatively large width and length such that the total size of the battery module is minimized when the battery cells are stacked to constitute the battery module. A preferred example of such a plate-shaped secondary battery may be a prismatic secondary battery or a pouch-shaped secondary battery. In particular, a pouch-shaped secondary battery configured to have a structure in which an electrode assembly is mounted in an electrode assembly receiving part formed at a battery case formed of a laminate sheet including a resin layer and a metal layer and a sealed portion ('outer edge sealed portion'), sealed by thermal welding, is formed at the outer edge of the electrode assembly receiving part is preferably used.

Meanwhile, the coolant is not particularly restricted so long as the coolant exhibits high cooling efficiency while easily flowing in the coolant conduit. For example, the coolant may be water, which has high latent heat, thereby maximizing cooling efficiency.

In accordance with another aspect of the present invention, there is provided a battery module including the cooling member with the above-stated construction.

The battery module according to the present invention is configured to have a structure in which a plurality of unit modules, each of which includes one or more battery cells, is arranged in a lateral direction and the cooling member is mounted at the top and/or the bottom of the battery module. Consequently, it is possible to configure a battery module in which cooling efficiency is greatly improved by a thermal conduction member and a coolant conduit of the cooling member and, at the same time, assembly efficiency is improved.

In accordance with a further aspect of the present invention, there is provided a battery pack including a plurality of battery modules arranged in a lateral direction.

The battery pack includes a plurality of battery modules in order to provide high power and large capacity. Consequently, the battery pack is preferably used as a power source for an electric vehicle, a hybrid electric vehicle, a plug-in hybrid electric vehicle, or a power storage device in which high-temperature heat generated during charge and discharge of the battery modules is a serious safety concern.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
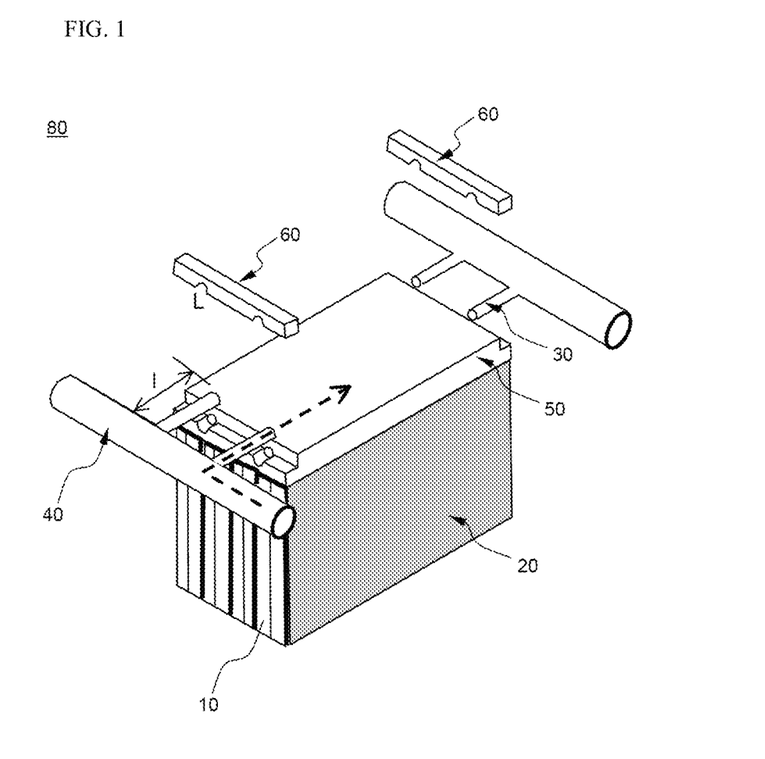
FIG. 1 is a perspective view showing a battery module according to an embodiment of the present invention.
Figure 2:
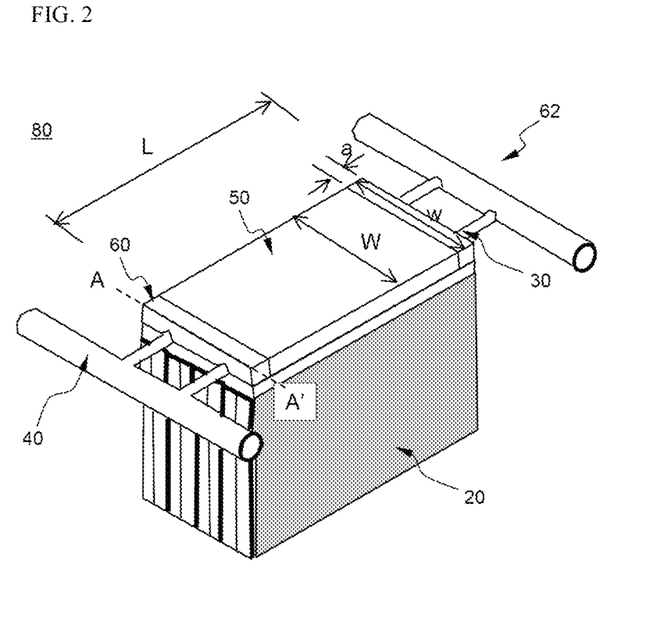
FIG. 2 is a perspective view showing a structure in which auxiliary plates are mounted to a fastening plate in the battery module of FIG. 1.

FIG. 1 is a perspective view typically showing a battery module according to an embodiment of the present invention and FIG. 2 is a perspective view typically showing a structure in which auxiliary plates are mounted to a fastening plate in the battery module of FIG. 1.

Figure 3:
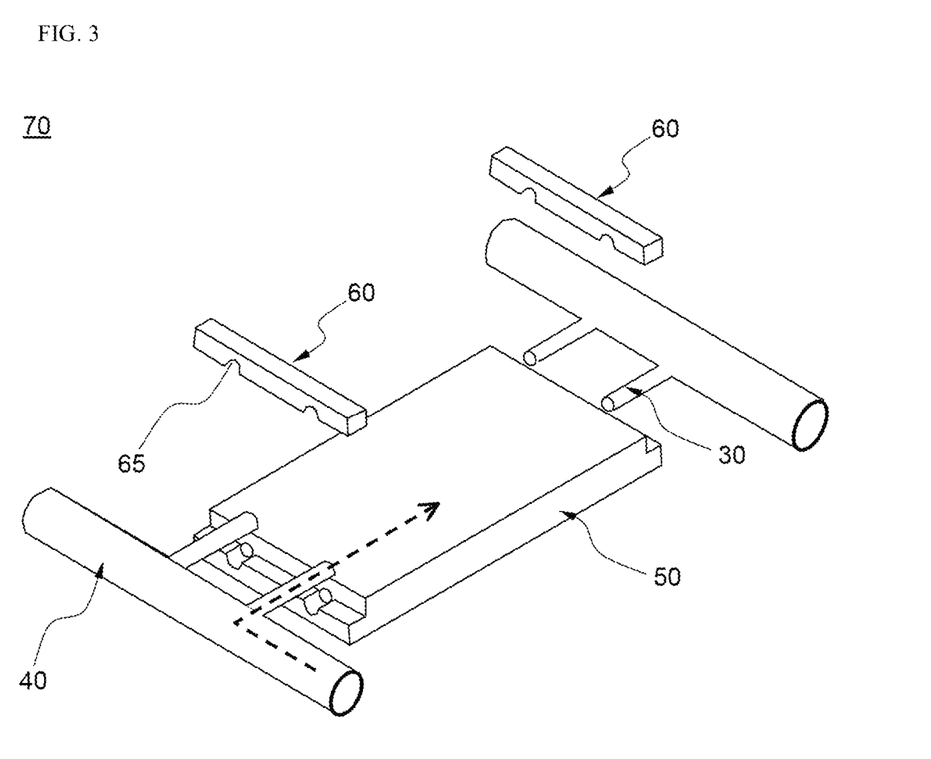
FIG. 3 is a view showing a cooling member of the battery module of FIG. 1.
Figure 4:
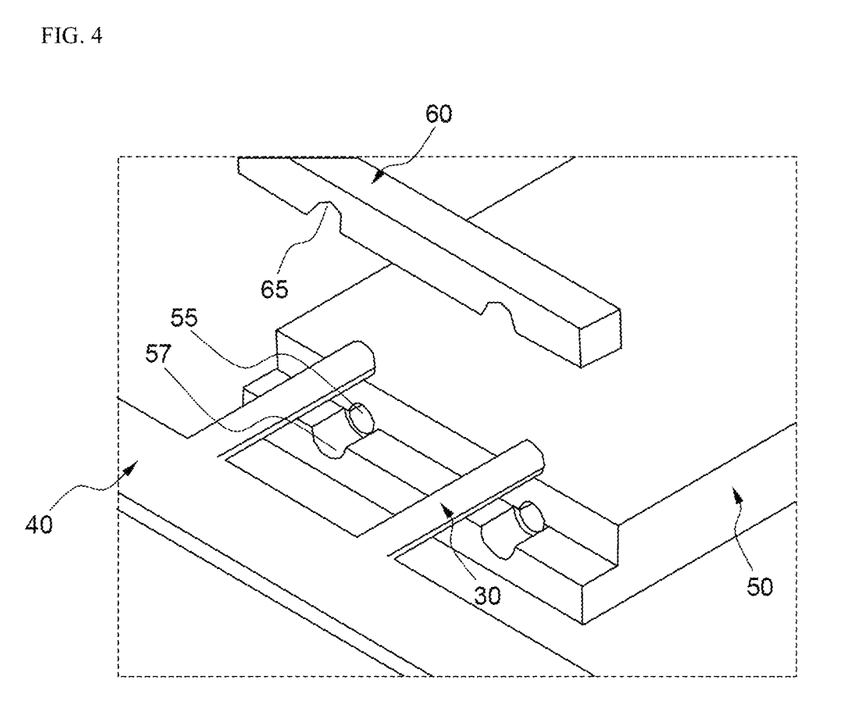
FIG. 4 is a partially enlarged view showing the cooling member of FIG. 3.
Figure 5:
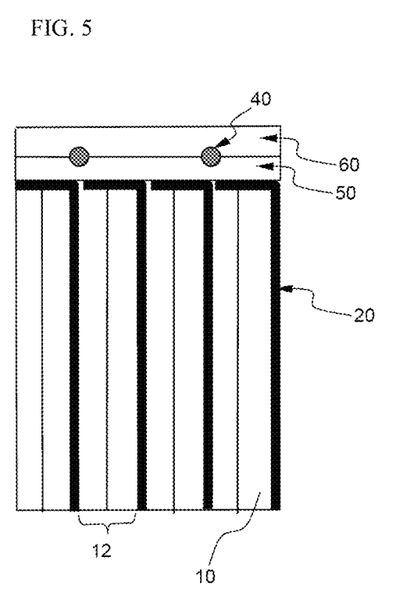
FIG. 5 is a sectional typical view taken along line A-A' of the battery module of FIG. 2.

In addition, FIG. 3 is a view typically showing a cooling member of the battery module of FIG. 1, FIG. 4 is a partially enlarged view typically showing the cooling member of FIG. 3, and FIG. 5 is a sectional typical view taken along line A-A' of the battery module of FIG. 2. In these drawings, electrode terminals of battery cells are not shown for the sake of convenience.

Referring to these drawings, the battery module 80 is configured to have a structure in which three unit modules 12, each of which includes a pair of battery cells 10, are arranged in a lateral direction and a cooling member 70 is mounted at the top of the battery module 10.

The cooling member 70 includes a thermal conduction member disposed at the top of the battery module 80, the thermal conduction member including a stepped fastening plate 50 having step portions of different lengths, coolant flow channels 55 being formed at interfaces of the fastening plate 50 such that the coolant flow channels communicate with branch conduits 30, and main conduits 40 and the branch conduits 30 configured to have a hollow structure through which a coolant flows.

The branch conduits 30 extend vertically in a state in which the branch conduits 30 communicate with the corresponding main conduits 40 such that the branch conduits 30 communicate with the coolant flow channels 55 of the thermal conduction member.

In addition, mounting grooves 57 corresponding to the external shape of the branch conduits 30 are formed in a relatively long step portion of the fastening plate 50 at ends of the coolant flow channels 55 such that the branch conduits 30 are connected to the coolant flow channels 55 of the thermal conduction member. At the fastening plate 50 are mounted auxiliary plates 60 for surrounding the outer circumferences of the branch conduits 30 in a state in which the branch conduits 30 are mounted in the mounting grooves 57.

At the bottom of each of the auxiliary plates 60 are formed fastening grooves 65 having a shape corresponding to the outer circumference of the branch conduits 30 in an inwardly depressed fashion. As a result, the branch conduits 30 are easily mounted between the fastening plate 50 and the auxiliary plates 60. The branch conduits 30 are located at the front and the rear of the battery module 80 in a state in which the branch conduits 30 are integrally connected to the main conduits 40.

Each of the auxiliary plates 60 has a length a equivalent to 10% a length L of the thermal conduction member. Each of the auxiliary plates 60 has a width w equal to a width W of the thermal conduction member. Consequently, the auxiliary plates 60, the fastening plate 50, and the branch conduits 30 are easily fastened to one another.

An insertion length l of each of the branch conduits 30 in a corresponding one of the coolant flow channels 55 is equivalent to 10% the length L of the thermal conduction member. Consequently, contact resistance between the cooling member 70 and the branch conduits 30 is minimized.

The branch conduits 30 are constituted by two conduits. Each of the main conduits 40 has a greater diameter than each of the branch conduits 30. For example, the diameter of each of the main conduits 40 is three times that of each of the branch conduits 30. The main conduits 40 and the branch conduits 30 are formed in a circular shape in vertical section. The main conduits and the branch conduits are formed of a corrosion-resistant material such that the main conduits and the branch conduits are prevented from being corroded by the coolant.

Meanwhile, cooling fins 20 are disposed between the respective unit modules 12 in a state in which opposite sides of each of the cooling fins 20 are in tight contact with corresponding ones of the unit modules 12. In addition, the cooling fins 20 are bent such that the cooling fins 20 contact the thermal conduction member in a surface contact fashion. Each of the cooling fins 20 is formed in a "¬" shape in vertical section and is formed of a heat conductive metal plate.

Figure 6:
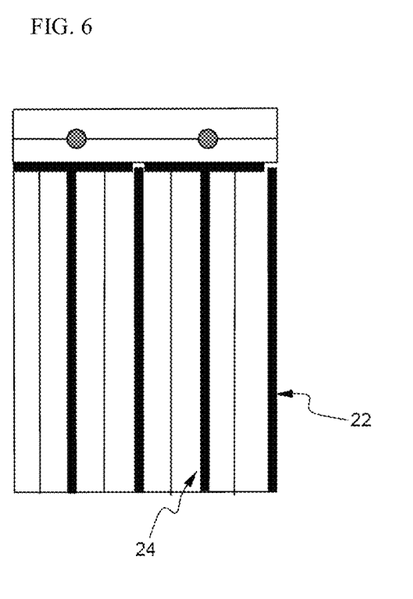
FIG. 6 is a sectional typical view showing cooling fins according to another embodiment of the present invention.

FIG. 6 is a sectional typical view showing cooling fins according to another embodiment of the present invention.

The cooling fins of FIG. 6 are identical in structure to those of FIG. 5 except that the cooling fins are formed in a "T" shape 24 and an "I" shape 22 in vertical section and, therefore, a detailed description will be omitted.

Figure 7:
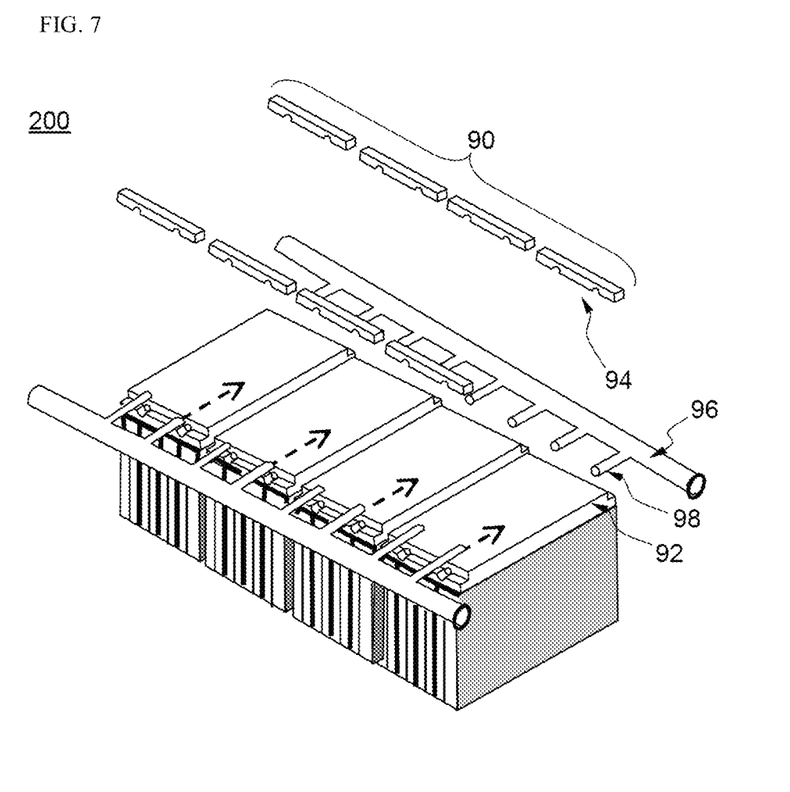
FIGS. 7 and 8 are perspective views showing battery packs according to other embodiments of the present invention.
Figure 8:
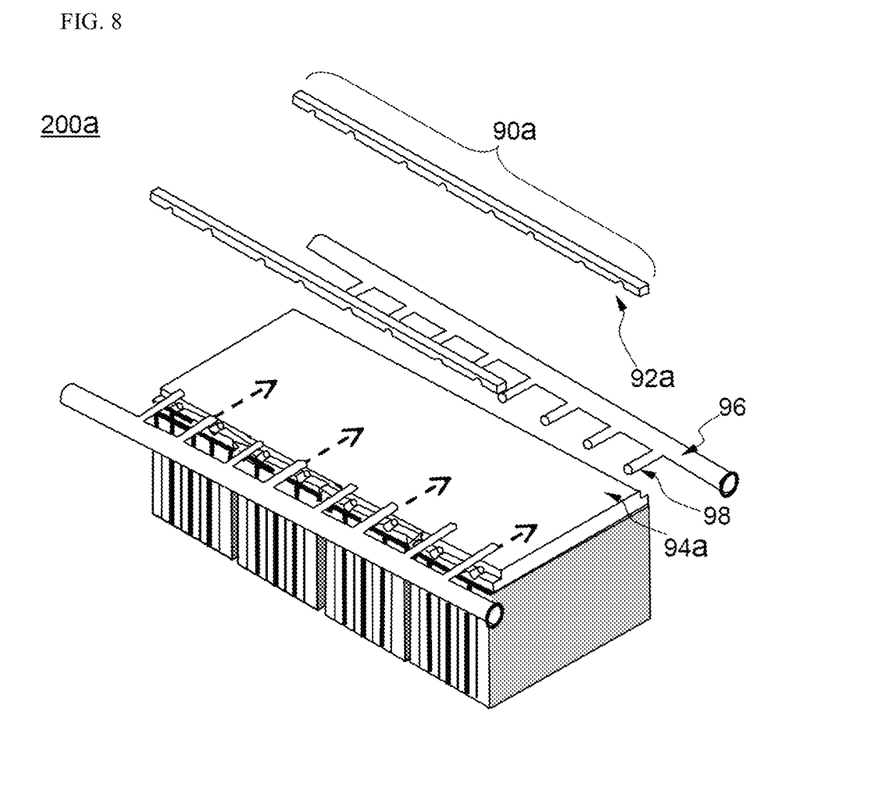
Figure 9:
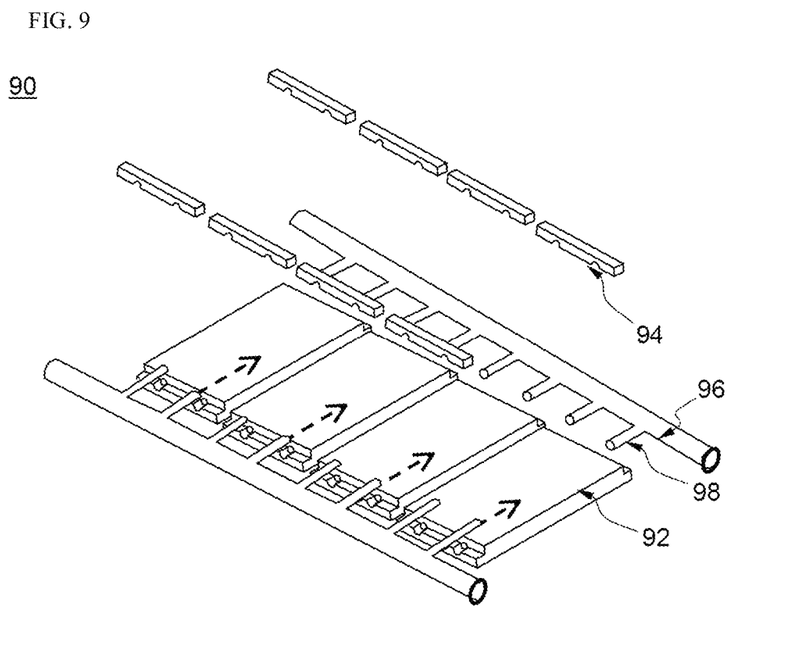
FIG. 9 is a perspective view showing a cooling member of FIG. 7.

FIGS. 7 and 8 are perspective views typically showing battery packs according to other embodiments of the present invention and FIG. 9 is a perspective view typically showing a cooling member of FIG. 7.

Referring first to FIG. 7, a battery pack 200 is configured to have a structure in which four battery modules, one of which is shown in FIG. 1, are arranged in a lateral direction and cooling members 90 are mounted at the tops of the respective battery modules per battery module to remove heat generated from battery cells during charge and discharge of the battery cells.

Referring to FIG. 9, the cooling member 90 includes a thermal conduction member including four fastening plates 92 and auxiliary plates 94, eight pairs of branch conduits 98, and a pair of main conduits 96.

A battery pack 200a of FIG. 8 is identical to the battery pack 200 of FIG. 7 except that a thermal conduction member includes one fastening plate 94a and auxiliary plates 92a and, therefore, a detailed description will be omitted.

Figure 10:
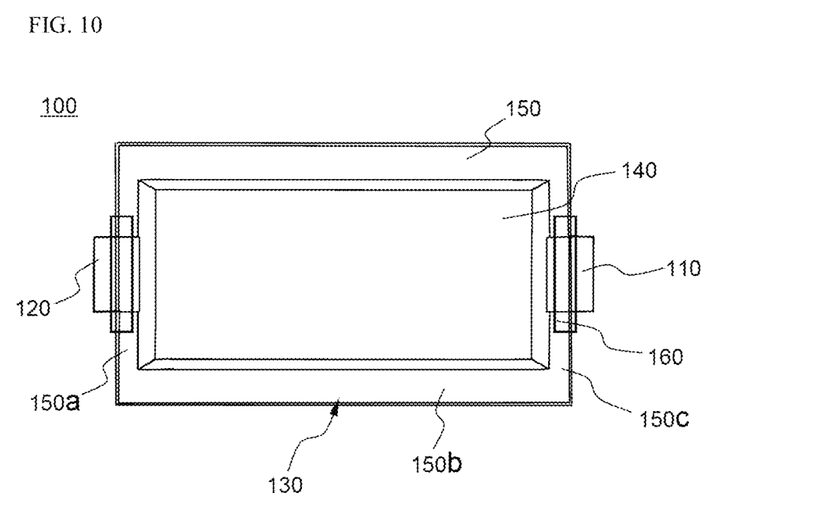
FIG. 10 is a perspective view showing an exemplary plate-shaped battery cell mounted in the battery module according to the present invention.

FIG. 10 is a perspective view typically showing an exemplary plate-shaped secondary battery mounted in the battery module according to the present invention.

Referring to FIG. 10, the plate-shaped secondary battery 100 is configured to have a structure in which two electrode leads 110 and 120 protrude from the upper end and the lower end of a battery case 130 in a state in which electrode leads 110 and 120 are opposite to each other.

The battery case 130 is formed of a laminate sheet including a metal layer and a resin layer. The battery case 130 includes an upper case and a lower case. In a state in which an electrode assembly (not shown) of a cathode/separator/anode structure is mounted in an electrode assembly receiving part 140 formed in the battery case 130, outer edges, i.e. lateral sides 150b, upper ends 150a, and lower ends 150c, of the electrode assembly receiving part 140 are sealed by thermal welding to form a sealed portion 150. As a result, the secondary battery 100 is manufactured.

The electrode leads 110 and 120 protrude from the upper end 150a and the lower end 150c, respectively. For this reason, the upper ends 150a and the lower ends 150c are thermally welded to each other, in a state in which a film type sealing member 160 is interposed between the electrode leads 110 and 120 and the battery case 130, in consideration of the thickness of the electrode leads 110 and 120 and the difference in material between the electrode leads 110 and 120 and the battery case 130, so as to increase sealability of the battery case 130.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

[Industrial Applicability]

As is apparent from the above description, a cooling member according to the present invention is configured to have a structure in which a thermal conduction member includes a stepped fastening plate having step portions of different lengths and coolant flow channels are formed at interfaces of the fastening plate such that the coolant flow channels communicate with a coolant conduit. As a result, a coolant, introduced into the coolant conduit, flows along the coolant flow channels of the thermal conduction member. Consequently, it is possible to prevent loss of cooling heat of the thermal conduction member as compared with a conventional structure in which additional auxiliary conduits are mounted in the thermal conduction member.

In addition, the coolant conduit includes main conduits and branch conduits extending from the main conduits such that the branch conduits communicate with the coolant flow channels, mounting grooves are formed in a relatively long step portion of the fastening plate at ends of the coolant flow channels, and auxiliary plates for surrounding the outer circumferences of the branch conduits in a state in which the branch conduits are mounted in the mounting grooves are mounted at the fastening plate. Consequently, it is possible to easily connect the branch conduits to the coolant flow channels of the thermal conduction member.

The invention claimed is:

1. A cooling member mounted at a top and/or a bottom of a battery module configured to have a structure in which a plurality of unit modules, each of which comprises one or more battery cells, is arranged in a lateral direction or a battery pack configured to have a structure in which a plurality of battery modules is arranged in a lateral direction to remove heat generated from the battery cells during charge and discharge of the battery cells, the cooling member comprising:

a thermal conduction member disposed at the top and/or the bottom of the battery module or the battery pack, the thermal conduction member comprising a stepped fastening plate having step portions of different lengths, coolant flow channels being formed at interfaces of the fastening plate; and a coolant conduit configured to have a hollow structure through which a coolant flows, the coolant conduit comprising a main conduit located at a front and/or a rear of the battery module or the battery pack and one or more branch conduits extending vertically in a state in which the branch conduits communicate with the main conduit such that the branch conduits communicate with the coolant flow channels of the thermal conduction member, wherein mounting grooves corresponding to an external shape of the branch conduits are formed in a relatively long step portion of the fastening plate at ends of the coolant flow channels of the thermal conduction member such that the branch conduits of the coolant conduit are connected to the coolant flow channels of the thermal conduction member, auxiliary plates for surrounding outer circumferences of the branch conduits in a state in which the branch conduits are mounted in the mounting grooves are mounted at the fastening plate, and the branch conduits are integrally connected to the main conduit.

2. The cooling member according to claim 1, wherein fastening grooves having a shape corresponding to the outer circumference of the branch conduits are formed at a bottom of each of the auxiliary plates in an inwardly depressed fashion.

3. The cooling member according to claim 1, wherein each of the auxiliary plates has a length equivalent to 2 to 10% that of the thermal conduction member.

4. The cooling member according to claim 1, wherein each of the auxiliary plates has a width equal to that of the thermal conduction member.

5. The cooling member according to claim 1, wherein an insertion length of each of the branch conduits in opposite ends of the mounting grooves is equivalent to 10 to 30% a length of the thermal conduction member.

6. The cooling member according to claim 1, wherein the coolant conduit and the mounting grooves are formed in a circular shape in vertical section.

7. The cooling member according to claim 1, wherein the branch conduits are constituted by two or more pipes.

8. The cooling member according to claim 1, wherein the main conduit has a greater diameter than each of the branch conduits.

9. The cooling member according to claim 1, wherein the coolant conduit is formed of a corrosion-resistant material.

10. The cooling member according to claim 1, wherein the thermal conduction member is a heat sink.

11. The cooling member according to claim 1, wherein the thermal conduction member is provided on a per battery module or battery pack basis.

12. The cooling member according to claim 1, further comprising cooling fins disposed between the respective unit modules in a state in which opposite sides of each of the cooling fins are in tight contact with corresponding ones of the unit modules.

13. The cooling member according to claim 12, wherein each of the cooling fins is formed in a "¬" shape, a "T" shape, a "[" shape, or an "I" shape in vertical section.

14. The cooling member according to claim 12, wherein each of the cooling fins is formed of a heat conductive metal plate.

15. The cooling member according to claim 1, wherein each of the battery cells is a plate-shaped secondary battery.

16. The cooling member according to claim 15, wherein the plate-shaped secondary battery is a pouch-shaped secondary battery configured to have a structure in which an electrode assembly of a cathode/separator/anode structure is mounted in a battery case formed of a laminate sheet comprising a resin layer and a metal layer.

17. The cooling member according to claim 1, wherein the coolant is water.

18. A battery module comprising a cooling member according to-claim 1.

19. A battery pack comprising a plurality of battery modules according to claim 18, wherein the battery modules are arranged in a lateral direction.

20. The battery pack according to claim 19, wherein the battery pack is used in an electric vehicle, a hybrid electric vehicle, a plug-in hybrid electric vehicle, or a power storage device.

* * * * *